(12) United States Patent
Hull et al.

(10) Patent No.: US 9,789,747 B2
(45) Date of Patent: Oct. 17, 2017

(54) SYSTEMS AND METHODS FOR DUCT PROTECTION OF A VEHICLE

(71) Applicant: The Boeing Company, Huntington Beach, CA (US)

(72) Inventors: John Ralph Hull, Sammamish, WA (US); Michael Strasik, Sammamish, WA (US); Bret A. Voss, Seattle, WA (US); Mark A. Negley, Kirkland, WA (US); William J. Sweet, Seattle, WA (US); Kevin R. Housen, Tacoma, WA (US); Jason S. Damazo, Seattle, WA (US); Michael D. Gonzales, Ravensdale, WA (US); Michael Howard-Edward Ware, Renton, WA (US); Lee Charles Firth, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 604 days.

(21) Appl. No.: 14/448,305

(22) Filed: Jul. 31, 2014

(65) Prior Publication Data

US 2016/0332501 A1    Nov. 17, 2016

(51) Int. Cl.

| F16L 57/00 | (2006.01) |
|---|---|
| F16L 9/14 | (2006.01) |
| B60H 1/00 | (2006.01) |
| F16L 57/02 | (2006.01) |
| F17D 5/02 | (2006.01) |

(Continued)

(52) U.S. Cl.
CPC .......... *B60H 1/00564* (2013.01); *B32B 1/08* (2013.01); *B32B 3/266* (2013.01); *B32B 5/024* (2013.01); *F16L 55/17* (2013.01); *F16L 57/02* (2013.01); *F16L 57/04* (2013.01); *F16L 59/145* (2013.01); *F17D 5/02* (2013.01); *B32B 2262/101* (2013.01); *B32B 2307/304* (2013.01); *B32B 2307/558* (2013.01); *B32B 2605/18* (2013.01)

(58) Field of Classification Search
CPC .................................................. B60H 1/00564
USPC .................................................. 138/110, 149
See application file for complete search history.

(56) References Cited

U.S. PATENT DOCUMENTS

| 2,766,614 A | 10/1956 | Cook |
|---|---|---|
| 3,254,651 A | 6/1966 | Collito |

(Continued)

FOREIGN PATENT DOCUMENTS

| CN | 201531711 U | 7/2010 |
|---|---|---|
| SU | 1080237 A1 | 3/1984 |
| WO | 2011075541 A1 | 6/2011 |

OTHER PUBLICATIONS

Great Britain Examination Report for related application GB1413705.3 dated Oct. 12, 2015; 2 pp.

(Continued)

*Primary Examiner* — Vishal Pancholi
(74) *Attorney, Agent, or Firm* — Armstrong Teasdale LLP

(57) ABSTRACT

Methods and systems for duct protection of a vehicle are provided. The methods and systems provided include an apparatus for containing a flow of fluid discharged from a fracture in a duct. The apparatus includes a ballistic containment layer and an insulation sheath coupled to the ballistic containment layer. The insulation sheath includes a first air containment layer, an insulation layer, and a second air containment layer.

15 Claims, 5 Drawing Sheets

(51) Int. Cl.
*F16L 59/14* (2006.01)
*F16L 55/17* (2006.01)
*B32B 1/08* (2006.01)
*B32B 3/26* (2006.01)
*B32B 5/02* (2006.01)
*F16L 57/04* (2006.01)

(56) References Cited

U.S. PATENT DOCUMENTS

| | | |
|---|---|---|
| 3,347,566 A | 10/1967 | Nelson |
| 3,704,034 A | 11/1972 | Harold et al. |
| 3,850,451 A | 11/1974 | Matthiessen |
| 3,948,295 A * | 4/1976 | Lemont ............... F16L 59/02 138/147 |
| 4,093,282 A | 6/1978 | Kyriakodis |
| 4,275,769 A * | 6/1981 | Cooke ............... F16L 57/04 138/109 |
| 4,335,905 A | 6/1982 | Bac |
| 4,848,409 A | 7/1989 | Jahnke, Jr. |
| 4,942,903 A * | 7/1990 | Jacobsen ........... F02M 37/0017 138/103 |
| 5,137,230 A | 8/1992 | Coffinberry |
| 5,507,533 A | 4/1996 | Mumma |
| 5,713,388 A | 2/1998 | Brewer |
| 5,741,029 A | 4/1998 | Wilson |
| 5,828,003 A * | 10/1998 | Thomeer ............... E21B 17/06 138/123 |
| 5,873,608 A | 2/1999 | Tharp et al. |
| 6,062,610 A | 5/2000 | Andersson |
| 6,627,561 B1 | 9/2003 | Wulliman et al. |
| 6,848,720 B2 | 2/2005 | Carns et al. |
| 7,493,911 B2 | 2/2009 | Carns et al. |
| 7,658,983 B2 | 2/2010 | Mormont et al. |
| 8,387,748 B2 | 3/2013 | Richardson, III et al. |
| 8,454,056 B2 | 6/2013 | Fernandes |
| 8,567,064 B1 | 10/2013 | Wright et al. |
| 9,395,025 B2 | 7/2016 | Ireland et al. |
| 9,534,718 B2 | 1/2017 | O'Neil et al. |
| 2005/0052018 A1 | 3/2005 | Pichotta |
| 2006/0284018 A1 | 12/2006 | Carns et al. |
| 2007/0252385 A1 | 11/2007 | Piantoni |
| 2009/0102187 A1 | 4/2009 | Carns et al. |
| 2010/0037974 A1 | 2/2010 | Fernandes et al. |
| 2010/0084035 A1 | 4/2010 | Binet et al. |
| 2010/0147446 A1 | 6/2010 | Ciolczyk et al. |
| 2012/0005866 A1 | 1/2012 | Ireland et al. |
| 2012/0018014 A1 | 1/2012 | Fernandes et al. |
| 2013/0263963 A1* | 10/2013 | Kalman ............... B32B 1/08 138/153 |

OTHER PUBLICATIONS

Great Britain Search Report for related application GB1413705.3 dated Jan. 20, 2015, 4 pp.
Great Britain Examination Report for related application GB1413705.3 dated Jul. 9, 2015; 2 pp.
U.S. Appl. No. 14/657,563, filed Mar. 13, 2015.
U.S. Appl. No. 13/961,162, filed Aug. 7, 2013.

* cited by examiner

SYSTEMS AND METHODS FOR DUCT PROTECTION OF A VEHICLE

BACKGROUND

The field of the disclosure relates generally to duct protection, and more specifically, to methods and systems for duct protection within a vehicle.

At least some known vehicles include ducts for channeling a flow of hot air, gases, or fluids through the vehicle. Often such ducts are positioned near structures that may be sensitive to heat and/or moisture. As such, if a rupture or burst in a duct occurs near such a structure, fluids escaping from the fractured duct, and/or debris that break off from the duct, may cause the structure to malfunction and/or undesired impact to the associated vehicle. In some known vehicles, a structural shielding system is used to create a physical barrier to separate and protect sensitive structures from ducts. However, a structural shielding system can be difficult or cumbersome to install, may be physically heavy, and/or expensive to manufacture or maintain.

BRIEF DESCRIPTION

In one aspect, an apparatus for use with a duct is provided. The apparatus includes a ballistic containment layer and an insulation sheath coupled to the ballistic containment layer. The insulation sheath includes a first air containment layer and a second air containment layer. The insulation sheath also includes an insulation layer positioned between the first and second air containment layers.

In another aspect, a method of fabricating an apparatus for containing a flow of fluid discharged from a fracture in a duct is provided. The method includes forming a ballistic containment layer and forming an insulation sheath. Forming the insulation sheath includes forming a first air containment layer and forming a second air containment layer. Forming the insulation sheath further includes forming an insulation layer positioned between the first and second air containment layers. The fabrication method further includes coupling the ballistic containment layer to the insulation sheath.

In yet another aspect, a duct protection system for a vehicle is provided. The duct protection system includes a duct and a duct burst apparatus. The duct burst apparatus includes a ballistic containment layer and an insulation sheath coupled to the ballistic containment layer. The insulation sheath includes a first air containment layer and a second air containment layer. The insulation sheath also includes an insulation layer positioned between the first and second air containment layers The features, functions, and advantages that have been discussed can be achieved independently in various examples or may be combined in yet other examples, further details of which can be seen with reference to the following description and drawings.

DETAILED DESCRIPTION

The systems and methods described herein enable duct protection of a vehicle. As used herein, the term "vehicle" refers to any mobile machine capable of transporting passengers, cargo, and/or equipment. For example, a vehicle may be included, but is not limited to only being an automobile (e.g., car, bus, and truck), a watercraft, a sailcraft, an aircraft, and/or a spacecraft.

Figure 1:
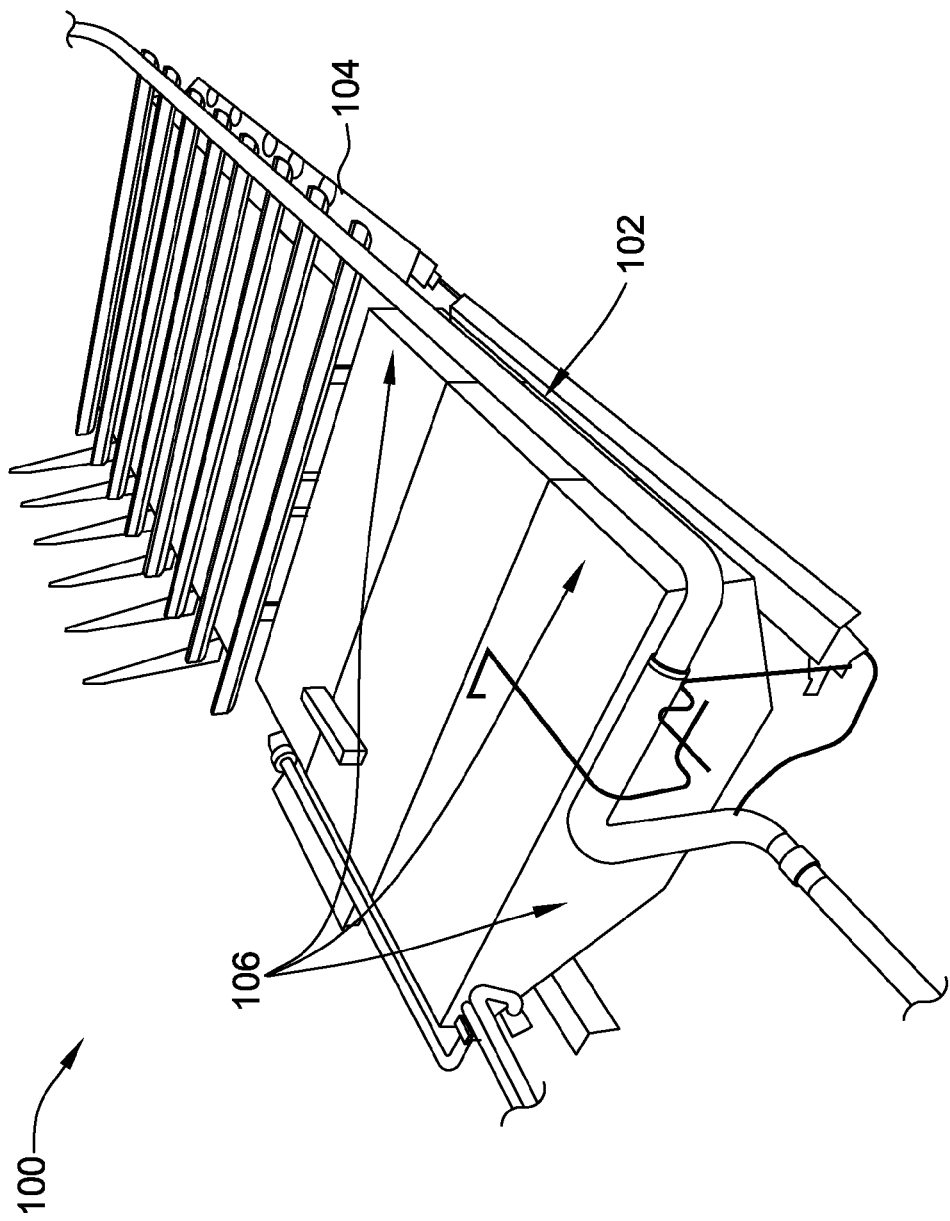
FIG. 1 is a perspective view of an exemplary duct system that may be used in a vehicle.

FIG. 1 is a perspective view of an exemplary duct system 100 that may be used with a vehicle (not shown). In the exemplary example duct system 100 is used with an aircraft, which may include, but is not limited to only including, airplanes, unmanned aerial vehicles (UAVs), gliders, helicopters, and/or any other vehicle that travels through airspace. Duct system 100 includes a duct 102 coupled to a support structure 104 within the aircraft. In the exemplary example, duct 102 is positioned adjacent to fuel tanks 106.

In the exemplary example, duct 102 is an auxiliary power unit (APU) air duct used to channel bleed air from the APU. Alternatively, duct 102 may be any duct capable of channeling air, gas, and/or liquid through a structure. Duct 102 may be any size, and may be formed from any material (e.g., titanium, stainless steel, or nickel alloy) that is capable of channeling air, gas, and/or liquid through a vehicle. In some examples, duct 102 channels at least one of a high pressure flow, a low pressure flow, a high temperature flow, and a low temperature flow therethrough.

Figure 2:
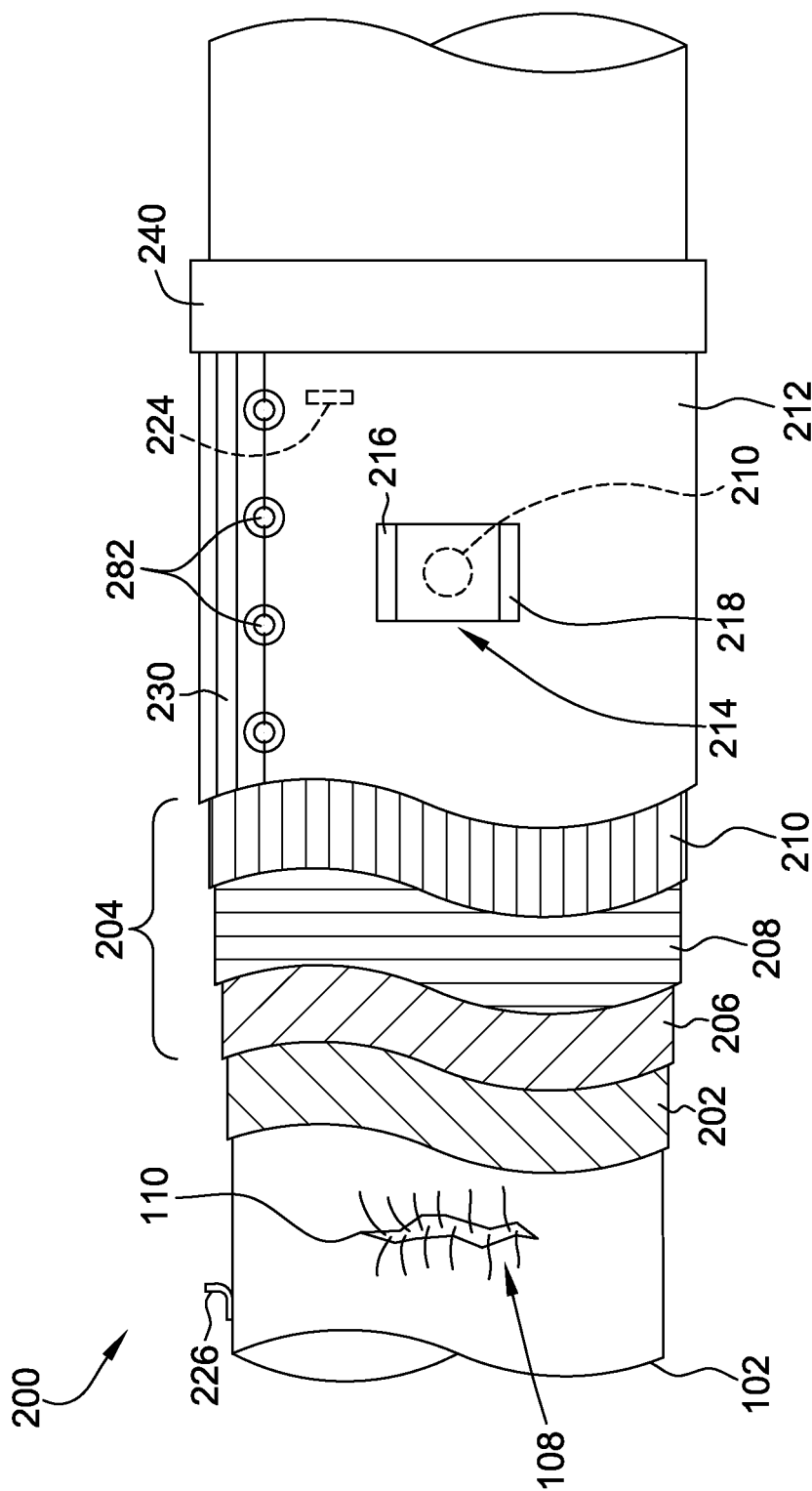
FIG. 2 is cutaway view of an exemplary duct burst apparatus that may be used with the duct system shown in FIG. 1.
Figure 3:
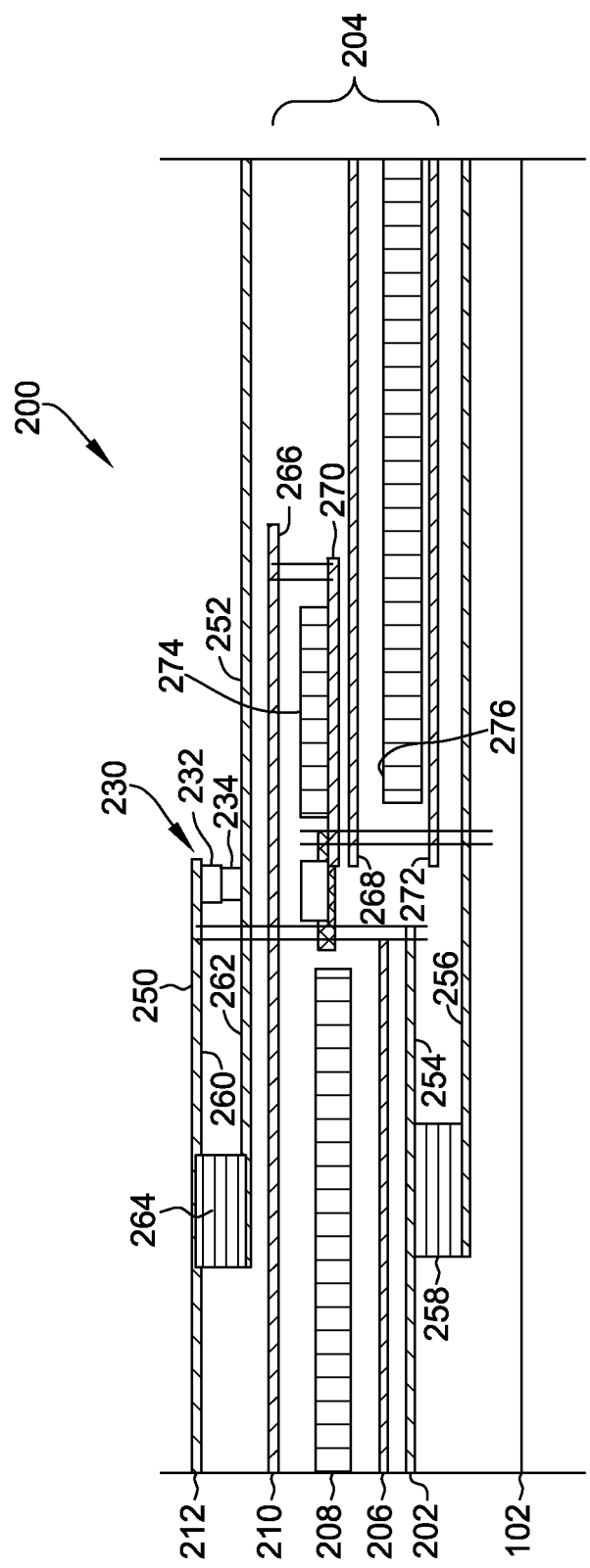
FIG. 3 is a cross sectional view of a duct burst apparatus that may be used with the duct system shown in FIG. 1.
Figure 4:
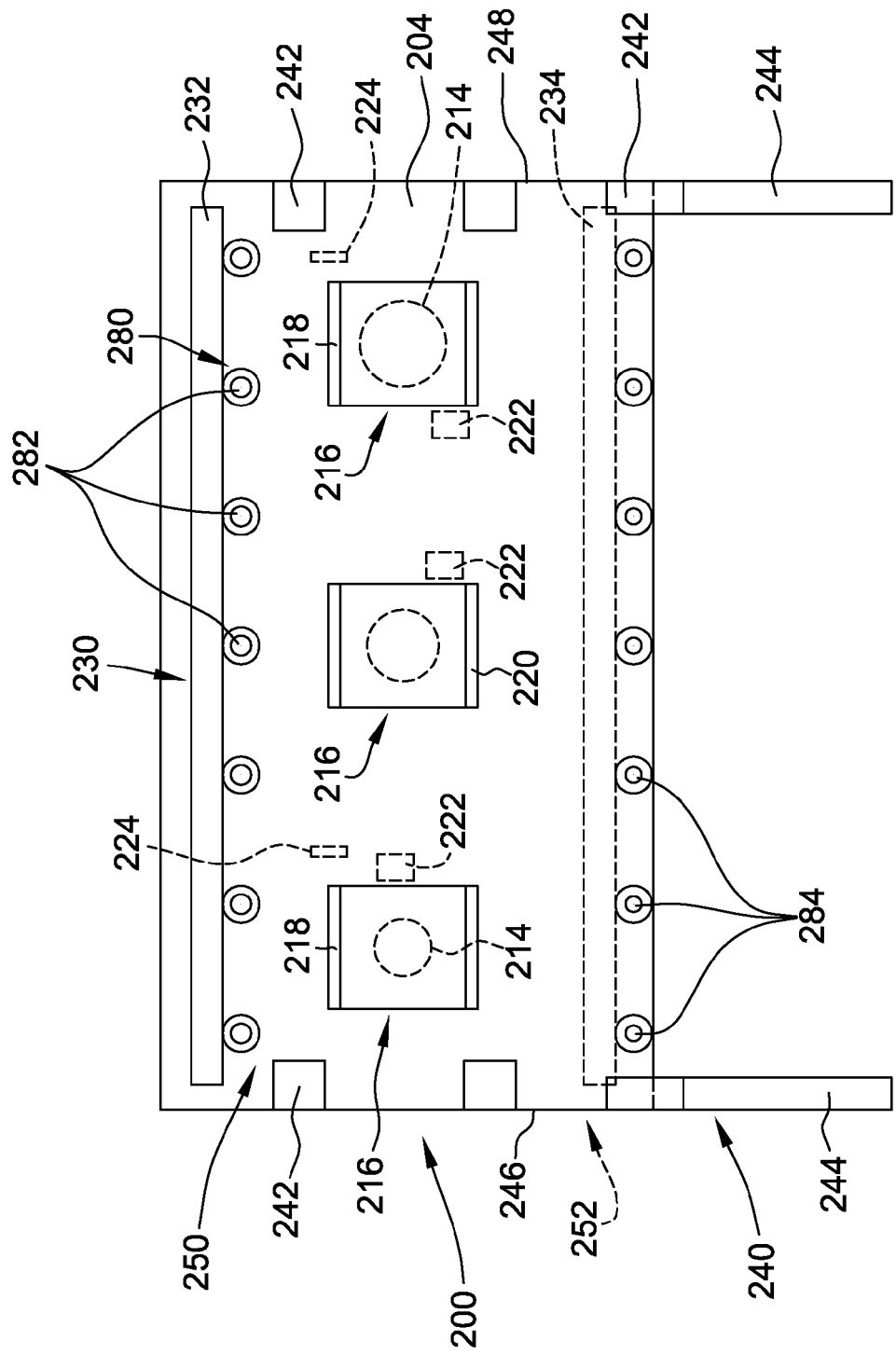
FIG. 4 is a plan view of the duct burst apparatus shown in FIG. 2.

FIG. 2 is cutaway view of an exemplary duct burst apparatus 200 that may be used with duct system 100 (shown in FIG. 1), FIG. 3 is a cross sectional view of duct burst apparatus 200, and FIG. 4 is a plan view of duct burst apparatus 200. In the exemplary example, duct burst apparatus 200 substantially circumscribes duct 102, to facilitate catching debris and channeling fluid flow 108 to protect surrounding structures from a burst resulting within duct 102. Duct burst apparatus 200 is also oriented to channel a fluid flow 108 discharged from a fracture 110 created in duct 102 during a duct burst to an outside environment and/or in a preferentially directed way.

In the exemplary example, duct burst apparatus 200 includes a ballistic containment layer 202 and an insulation sheath 204 that substantially circumscribes ballistic containment layer 202. Insulation sheath 204 includes, an inner air containment layer 206, an insulation layer 208, and an outer air containment layer 210 wherein layer 208 is between layers 206 and 210 to protect layer 208 from contact with the high pressure fluid escaping from duct 102 during a duct burst event. In the exemplary example, ballistic containment layer 202 substantially mates against duct 102 and insulation sheath 204 substantially circumscribes ballistic containment layer 202. Because ballistic containment layer 202 extends about duct 102, layer 202 facilitates impeding the opening of a duct fracture 110, and then facilitates preventing a piece of duct 102 from breaking from duct 102 to protect the structures surrounding duct 102. Furthermore, by intercepting the debris before it has a chance to be accelerated by fluid flow 108 from duct 102, ballistic containment layer 202 facilitates "catching" the debris before it is accelerated to a velocity sufficient to penetrate ballistic containment layer 202. Moreover, insulation sheath 204 may be the innermost layer and contact duct 102, and ballistic containment layer 202 may circumscribe insulation sheath 204. In another example, insulation sheath 204 is formed integrally with ballistic containment layer 202. In some examples, either ballistic containment layer 202 and/or air containment layers 206 and 210 function as an insulation layer 208.

In the exemplary example, duct burst apparatus 200 includes an outer ballistic containment layer 212 that substantially circumscribes insulation sheath 204 such that outer ballistic containment layer 212 is the outermost layer of duct burst apparatus 200. Alternatively, duct burst apparatus may not include outer ballistic containment layer 212, and in such examples, insulation sheath 204 is the outermost layer of duct burst apparatus 200.

In the exemplary example, ballistic containment layer 202 is formed from a para-aramid fibrous material capable of absorbing debris and impacts generated from an explosion or burst within duct 102. Generally, ballistic containment layer 202 is formed from any material including, but not limited to, a ceramic material, a braided and/or weaved fiber of graphite material, a glass material, or carbon fiber weaved having any thickness that facilitates absorbing debris and an impact generated from an explosion or burst within duct 102. Ballistic containment layer 202 is formed with a thickness in the range of about 0.0625 inches to about 0.125 inches. In the exemplary implementation, ballistic containment layer 202 is formed from a weave of S-glass fibers that have a high tensile strength selected to facilitate preventing debris from a duct burst from penetrating. Ballistic containment layer 202 may also be formed from a weave of E-glass fibers. In one example, ballistic containment layer 202 is fabricated from a fiberglass weave having a fiber spacing density within a range of between about 5.0 ounces per yard (oz./yd.) to approximately about 20.0 oz./yd. More specifically, in one example, ballistic containment layer 202 is fabricated from a fiberglass weave having a fiber spacing density within a range of between about 10.0 ounces per yard (oz./yd.) to approximately about 15.0 oz./yd. Furthermore, in the exemplary example, ballistic containment layer 202 is fabricated from a fiberglass weave in which the glass fiber rovings are within a range of between 1.0 pick per inch to approximately 20.0 picks per inch. More specifically, ballistic containment layer 202 is fabricated from a fiberglass weave in which the glass fiber rovings are 5 picks per inch. Such material characteristics allow ballistic containment layer 202 to have an appropriate yield that enable it to absorb the impact from a duct burst event. However, it is understood that one having ordinary skill in the art would recognize other suitable alternatives.

Ballistic containment layer 202 is wrapped about duct 102 such that layer 202 intercepts debris of any size, while still being able to stretch to absorb the impact energy of the debris. As such, it is desirable that each strand of the fiberglass weave be pulled through the woven structure by an amount that extends the stretching beyond the part of the strand immediately adjacent to duct fracture 110. Furthermore, ballistic containment layer 202 is formed from any material that can withstand the high temperatures within duct 102, without significant degradation of strength or elasticity properties. More specifically, in one example, ballistic containment layer 202 is formed from a material that is able to withstand temperatures within a range of approximately 300° F. to approximately 600° F.

In examples where ballistic containment layer 202 is formed from a fiberglass weave, a thin layer of sizing (not shown) is applied to the weave during manufacturing to facilitate shielding the fiberglass from environmental exposure to, for example, moisture. Typically, the sizing is formed from a silicon polymer material that has a low temperature resistance, and, that when exposed to temperatures within the range specified above, chemically degrades into a tacky residue that substantially prevents the glass fibers from moving within the weave such that duct debris is arrested. Accordingly, to prevent such degradation, in the exemplary example, the sizing is removed from the fiberglass weave before installation on duct 102. Alternatively, the fiberglass weave may be formed without the sizing, or the sizing may be formed from a material having a high temperature resistance, in which case the sizing does not require removal.

In the exemplary example, inner and outer air containment layers 206 and 210 substantially encapsulate insulation layer 208 therebetween such that insulation layer 208 is substantially isolated from fluid flow 108 from any fracture 110. More specifically, in the exemplary example, inner and outer air containment layers 206 and 210 are formed from a temperature resistant, impermeable material, such as, but not limited to, silicone rubber, such that inner and outer air containment layers 206 and 210 facilitate shielding insulation layer 208 from exposure to the high temperature and high pressure fluid flow 108. Traditionally, the type of insulation used in a duct protection device was limited to those materials having with enough weight and density to be able to withstand exposure to the fluid flow from the duct fracture without degrading. However, because insulation layer 208 is not exposed to fluid flow 108 or to any other fluid, a wider range of insulating materials, such as those having better insulating properties and/or those having a lower density and lighter weight, may be used to form layer 208. For example, in the exemplary example, insulation layer 208 is formed from fiberglass ceramic felt material and has a thickness between 0.125 inch to 0.5 inches such that insulation layer 208 facilitates insulating sensitive equipment, such as fuel tanks 106 (shown in FIG. 1), from duct 102 having a temperature within a range of approximately 300 degrees to approximately 600 degrees. Alternatively, insulation layer 208 can be formed from any material having any thickness that facilitates insulating fuel tanks 106 from any temperature duct 102.

Furthermore, variations in aircraft altitude may cause the air within apparatus 200 to expand and increase the pressure within apparatus 200. Moreover, variations in altitude may cause condensation to form between any of layers 202, 206, 208, 210 within apparatus 200. As such, apparatus 200 may include a release port (not shown) that is operable to relieve any pressure buildup in apparatus 200. The release port is preferably positioned at a bottom side of apparatus 200 such that in the event of condensate formation, gravity will force the condensate to collect at the bottom of apparatus 200, where is can be vented through the release port.

As described above, inner and outer air containment layers 206 and 210 are formed from a temperature resistant, impermeable material. More specifically, inner and outer air containment layers 206 and 210 are each formed from a lightweight, non-porous material capable of sealing and/or retaining air, gas, or liquids. In some examples, inner and outer air containment layers 206 and 210 are formed from either a silicone coated glass cloth material and/or a substantially flexible polymer coated fabric, and is formed with a thickness in the range of ⅛ inch to 1/32 inch. Alternatively, inner and outer air containment layers 206 and 210 are formed from any material having any thickness that facilitates substantially containing and/or sealing flow from duct 102. In the exemplary example, inner and outer air containment layers 206 and 210 are formed from the same material.

Alternatively, inner containment layer 206 is formed from a material that is more heat resistant than outer containment layer 210.

In the exemplary example, duct burst apparatus 200 also includes outer ballistic containment layer 212 as its outermost layer. In the exemplary example, outer ballistic containment layer 212 is coupled about outer air containment layer 210 of insulation sheath 204. Because outer ballistic containment layer 212 circumscribes insulation sheath 204, outer ballistic containment layer 212 is exposed only to the ambient temperature. As such, outer ballistic containment layer 212 need not be formed from a material having as high temperature resistance as ballistic containment layer 202, but rather may be formed from a material that substantially prevents penetration of debris at room temperature, such as, but not limited to, fiber composite materials.

A radially-oriented vent 214 is formed in each layer 206, 208, and 210. Vent 214 is configured to direct fluid flow 108 discharged from fracture 110 sustained in duct 102 to an outside environment away from sensitive equipment, such as fuel tanks 106 (shown in FIG. 1). Vent 214 is formed on apparatus 200 and at least within layers 206, 208, and 210 to cause fluid flow 108 (e.g., air, gas, or liquid) to be channeled through entire apparatus 200 and a cavity formed between apparatus 200 and duct 102. Fluid flow 108 is discharged from vent 214 at a predetermined location that facilitates protecting structures, such as tanks 106 and support structure 108 (both shown in FIG. 1) from flow 108 exiting fracture 110. In the exemplary example, vents 214 are fabricated from the same material as air containment layers 206 and 210. Alternatively, vents 214 may be fabricated from any material that is impermeable to fluid flow 108. In each example, insulation layer 208 is isolated from, and not exposed to, flow 108. Although FIG. 4 illustrates apparatus 200 including three vents 214, any number of vents 214 of any size can be used throughout apparatus 200.

In the exemplary example, a vent cover 216 is secured over each vent 214 to prevent objects from accessing and potentially damaging ballistic containment layer 202 from outside apparatus 200 through vent 214. Vent cover 216 is fabricated from the same material used to fabricate outer air containment layer 210. Alternatively, vent cover 216 may be fabricated from any other material or combination of materials. Vent cover 216 is coupled to outer air containment layer 210 via a first securement portion 218 and a second securement portion 220. In the exemplary example, first securement portion 218 fixedly couples vent cover 216 to outer air containment layer 210 via stitching. Alternatively, portion 218 can be coupled to layer 210 using any coupling manner that fixedly secures vent cover 216 to layer 210 such as, but not limited to, ultrasonic welding and/or mechanical fasteners. In the exemplary example, second securement portion 220 releasably couples vent cover 216 to outer air containment layer 210 via hook and loop fasteners. Alternatively, portion 218 can be coupled to layer 204 using any coupling means that releasably couples vent cover 216 to layer 210.

In some examples, a sensor 222 is positioned adjacent to vent 214. More specifically, in the exemplary example, sensor 222 is within vent cover 216. In the exemplary example, sensor 222 is a thermal sensor. Alternatively, sensor 222 can be any sensor used to detect flow or heat characteristics such as, but not limited to, a chemical sensor, a flow sensor, and/or strain gauge. In some examples, sensor 222 is coupled to a display unit (not shown) to enable data collected by sensor 222 can be quickly viewed. Alternatively, sensor 222 is coupled to a remote computing device (not shown) that stores, analyzes, presents, and/or transmits data collected by sensor 222. It should be noted that sensor 222 can be coupled to a display unit and/or a remote computing device via a wired or wireless signal. In the exemplary example, apparatus 200 directs flow 108 discharged from fracture 110 towards sensor 222 such that flow characteristics of flow 108 may be presented to a user.

Apparatus 200 also includes an anti-rotation feature 224 that substantially prevents apparatus 200 from rotating about duct 102 as flow 108 is discharged from fracture 110. Feature 224 is formed within layers 202, 206, 208, 210, and 212 and is sized to receive a tab 226 extending from duct 102. It should be noted that feature 224 can be any feature that substantially prevents rotation of apparatus 200 relative to duct 102 including, but not limited to hose clamps.

In the exemplary example, apparatus 200 includes a length-wise fastener system 230 and a width-wise fastener system 240. As used herein, either fastener system 230 and/or 240 may be a self-supporting fastener. In the exemplary example, length-wise fastener system 230 includes a first length-wise fastener 232 coupled to an outer side 250 of the outermost layer (e.g., outer air containment layer 210 or outer ballistic containment layer 212) of apparatus 200 and a second length-wise fastener 234 coupled to an inner side 252 of the outermost layer (e.g., outer air containment layer 210 or outer ballistic containment layer 212) of apparatus 200. As apparatus 200 is positioned around duct 102, first fastener 232 mates with second fastener 234 to secure apparatus 200 to duct 102 and to substantially seal flow 108 within apparatus 200. Similarly, width-wise fastener system 240 includes at least one first width-wise fastener 242 and a second width-wise fastener 244 coupled to outer side 250 of apparatus 200. First fastener 242 mates with second fastener 244. First fastener 242 and second fastener 244 are coupled to outer side 250 adjacent to opposing width-wise edges 246 and 248 of apparatus 200 to substantially seal flow 108 within apparatus 200. In the exemplary example, fastener systems 230 and 240 each include a self-supporting fastener such as, but not limited to, a pressure zipper. Alternatively, fastener systems 230 and 240 may include a hook and loop fastener or any fastener that facilitates operation of apparatus as described herein. Fastener systems 230 and 240 and are each releasably coupled to duct 102 to enable apparatus 200 and/or duct 102 to be inspected.

In the exemplary example, opposing ends 254 and 256 of ballistic containment layer 202 are coupled together via a fastener 258, such as, but not limited to, a stainless steel hook and loop fastener that enables opposing ends 254 and 256 to be releasbly coupled together. In operation during a duct burst event, fastener 258 must withstand elevated pressures and temperatures without failing. As such, fastener 258 may be any type of fastener comprised of any material able to withstand such an environment. Similarly, opposing ends 260 and 262 of outer ballistic containment layer 212 are coupled together via a fastener 264, such as, but not limited to, a stainless steel hook and loop fastener. Insulation layer 208 is coupled to at least one of inner and outer air containment layers 206 and 210 via stitching and/or adhesion bonding. Alternatively, inner and/or outer air containment layers 206 and 210 may be coupled to insulation layer 208 using any means that enables operation of the apparatus 200 as described herein. Coupling insulation layer 208 to air containment layers 206 and/or 208 facilitates holding insulation layer 208 in place to prevent movent of insulation layer 208 between inner and outer air containment layers 206 and 210.

Furthermore, in the exemplary example, outer air containment layer 210 includes a first end 266 and an opposing second end 268. Similarly, inner containment layer 206 includes a first end 270 and an opposing second end 272. Also, insulation layer 208 includes a first end 274 and an opposing second end 276. In the exemplary example, first ends 266 and 270 extend a distance onward from first end 274 of insulation layer 208 such that ends 266 and 270 of layers 206 and 210 may be fastened together by stitching, or any other manner. Similarly, second ends 268 and 272 extend a distance from second end 276 of insulation layer 208 such that second ends 268 and 272 of layers 206 and 210 may be fastened together. As such, air containment layers 206 and 210 encapsulate insulation layer 208 to substantially prevent exposure of insulation layer 208 to fluid flow 108. Duct burst apparatus 200 also includes a ballistic zipper fastener 278 positioned on at least one of layers 206, 208, 210 of insulation sheath 204. Similar to fastener systems 230 and 240, fasteners 258, 264, and 278 are releasably coupled to duct 102 such that apparatus 200 may be removed from duct 102 for inspection of duct 102 and/or apparatus 200.

In some examples, apparatus 200 includes a plurality of securement devices 280 that substantially prevent separation of a length-wise seam of first fasteners 232 and 234 in apparatus 200. In the exemplary example, a plurality of cavities 282 defined in apparatus 200 are sized to receive apparatus 200 to enable apparatus 200 to be substantially secured about duct 102 as fiberglass cloth laces threaded through cavities 282. In one example, a plurality of grommets 284 are positioned within a respective cavity 282 to substantially prevent tearing of apparatus 200 by fiberglass cloth laces. Alternatively, a plurality of securement can be any manner that prevents separation of a lengthwise seam of first fasteners 232 and 234 including, but not limited to, mechanical fasteners, wire laces, capstans, zippers, or a combination thereof.

In the event of a duct burst causing fracture 110 in duct 102, ballistic containment layer 202 is configured to deform to prevent penetration of duct 102 debris therethrough. More specifically, ballistic containment layer is wrapped around duct 102 such that it intercepts debris of any significant size, but, at the same time, it is desirable that ballistic containment layer 202 includes some slack around duct 102 to be able to stretch to absorb the impact energy of the debris. As a portion of duct 102 from fracture 110 moves radially outward, as does the portion of ballistic containment layer 202 immediately adjacent thereto. As such, it is desirable that each strand of the fiberglass weave of ballistic containment layer 202 be able to be pulled axially and circumferentially through the woven structure by a small amount in order to extend the stretching beyond the part of the strand immediately adjacent to duct fracture 110 such that the remainder of the circumference of ballistic containment layer 202 is pulled taut to duct 102. It is important that ballistic containment layer 202 have the necessary yield to be able to catch a duct fragment and stretch to absorb the force, but ballistic containment layer 202, and therefore apparatus 200, must also be wrapped around duct with enough compressive force to maintain the position of apparatus 200 on duct 102.

Furthermore, ballistic containment layer 202 is configured to be permeable to allow high temperature and high pressure flow of fluid flow 108 to pass therethrough. However, inner air containment layer 206 is impermeable to fluid flow 110 such that flow 108 is diverted circumferentially and/or axially within apparatus 200 between ballistic containment layer 202 and inner air containment layer 206 until flow 108 reaches one of vents 214. As described above, vents 214 are formed in at least layers 206, 208, and 210 and are configured to channel fluid flow 108 therethrough. Air containment layers 206 and 210 and vents 214 are configured to isolate insulation layer 208 from the high temperature and high temperature fluid flow 108 to prevent fluid flow 108 from degenerating insulation layer and causing pieces of insulation to obstruct or choke vents 214. If fluid flow 108 were to encounter an unprotected insulation layer 208, flow 108 may break apart layer 208 and cause pieces of layer 208 to obstruct vents 214, therefore preventing the release of flow 108 to the atmosphere. As such, impermeable inner air containment layer 206 directs fluid flow 108 through at least one impermeable vent 214 to protect insulation layer 208. In the exemplary example, outer air containment layer 210 is also impermeable to fluid flow 108 to prevent exposing insulation layer 208 to fluid flow 108 once flow exits apparatus 200. In examples where apparatus 200 includes outer ballistic containment layer 212, also having a vent 214, outer air containment layer 210 may not be impermeable.

Fluid flow 108 exiting fracture 110 is channeled through apparatus 200 and creates pressure on vent cover 216 until the pressure is strong enough to release portion 220 from layer 210 or 212 to enable flow 108 to exhaust from vent 214. As such, first securement portion 218 is substantially flexible to enable second securement portion 220 to release from layer 210 or 212, while first securement portion 218 remains coupled to layer 210 or 212. Additionally, second securement portion 220 can be configured to couple to layer 210 or 212 such that a predetermined pressure is needed to release portion 220. For example, cover 216 may be releasably coupled to layer 210 or 212 such that 170 pounds per square inch (psi) are needed to release portion 220. Alternatively, cover 216 can be configured to releasably couple to layer 210 or 212 by any pressure.

Figure 5:
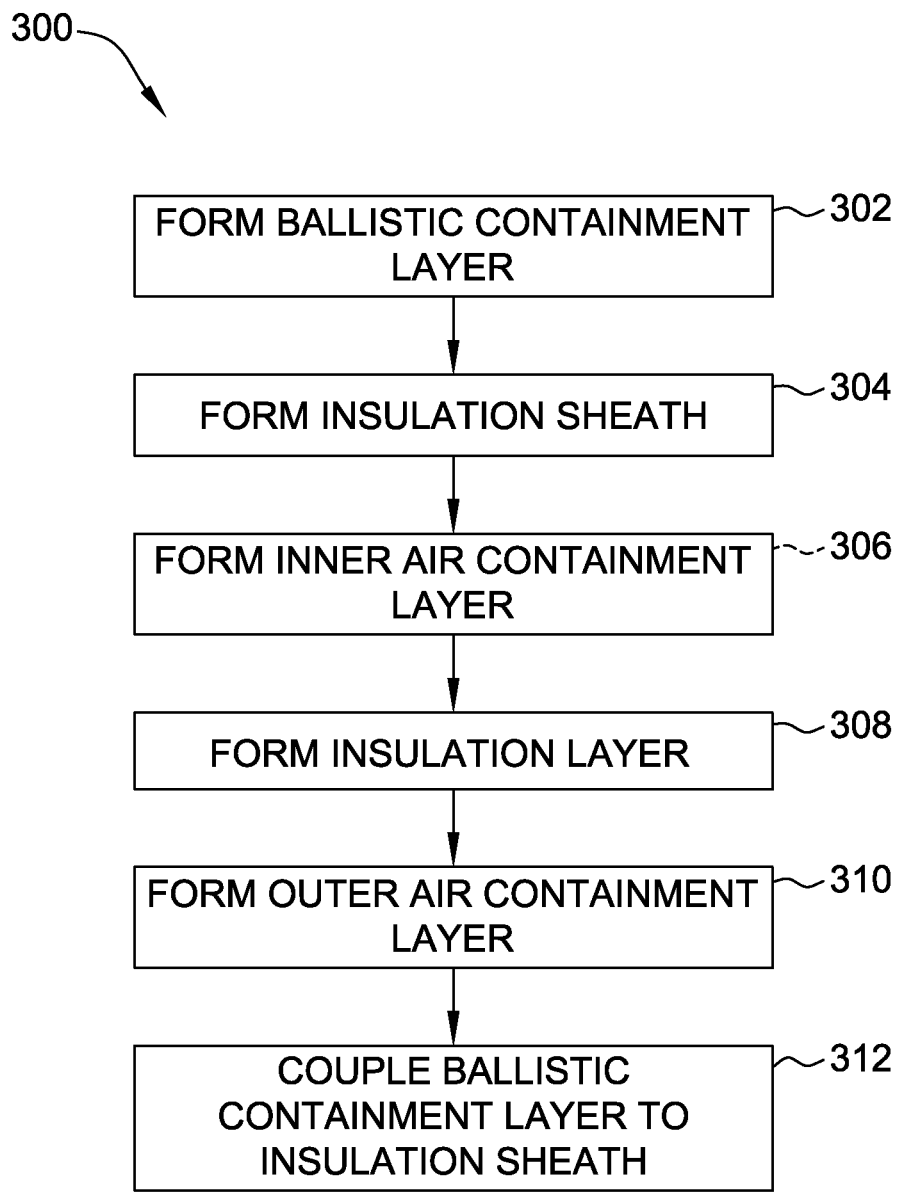
FIG. 5 is a flowchart of an exemplary method of fabricating the apparatus shown in FIG. 2.

FIG. 5 is a flowchart of an exemplary method 300 of fabricating apparatus 200. Method 300 includes forming 302 ballistic containment layer 202 and forming 304 insulation sheath 204 that substantially circumscribes ballistic containment layer 202. Forming 304 insulation sheath 204 comprises forming 306 inner air containment layer 206, forming 308 insulation layer 208, and forming 310 outer air containment layer 210. In the exemplary example, ballistic containment layer 202 is formed 302 in apparatus 200 such that layer 202 is configured to substantially mate against duct 102. Moreover, ballistic containment layer 202 is formed 302 from a temperature resistant fiberglass weave of S-glass fibers that is permeable to enable fluid flow 108 to pass therethrough. Further, inner and outer air containment layers 206 and 210 are formed 306 and 310 from a temperature resistant material, such as, but not limited to, silicone rubber or silicone coated fiberglass that is impermeable to prevent fluid flow 108 from passing therethrough. Method 300 also includes coupling 312 ballistic containment layer 202 to insulation sheath 204.

The examples described herein enable structures of a vehicle to be protected from explosions, fragments, and/or bursts that may occur within ducts of the vehicle. The examples described herein also provide a cost effective system for protecting a vehicle from irreparable harm by eliminating the need for a structural shielding systems that can be cumbersome, heavy, and costly to manufacture and maintain. Furthermore, the examples described herein isolate the insulation layer from the high pressure fluid flow that may result from the duct burst. As such, the examples described herein prevent exposure of the insulation layer to the fluid flow and, therefore, prevent degradation of the insulation layer and obstruction of the vents. Although the examples described above are described in relation to a vehicle, the examples may be implemented in stationary applications such as buildings having heat sensitive structures.

Although specific features of various examples of the invention may be shown in some drawings and not in others, this is for convenience only. In accordance with the principles of the invention, any feature of a drawing may be referenced and/or claimed in combination with any feature of any other drawing.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for use with a duct that channels a fluid therethrough, said apparatus comprising:
    a ballistic containment layer configured to be exposed to the fluid, wherein said ballistic containment layer mates against the duct;
    an insulation sheath coupled to said ballistic containment layer such that said insulation sheath circumscribes said ballistic containment layer, wherein said insulation sheath is configured to restrict heat transfer from within the duct, said insulation sheath comprising:
        a first air containment layer;
        a second air containment layer; and
        an insulation layer positioned between said first and second air containment layers; and
    a vent defined through said first air containment layer, said second air containment layer, and said insulation layer.

2. The apparatus according to claim 1 further comprising an outer ballistic containment layer substantially circumscribes said insulation sheath.

3. The apparatus according to claim 1, wherein said ballistic layer comprises a fiberglass weave of S-glass fibers.

4. The apparatus according to claim 1, wherein said first and said second air containment layers encapsulate said insulation layer to substantially isolate said insulation layer from fluid flowing from the duct through the fracture.

5. The apparatus according to claim 1, wherein said first and said second air containment layers are formed from a temperature-resistant material that is substantially impermeable to fluid flowing from the duct through the fracture.

6. The apparatus according to claim 1 further comprising a releasable fastener coupled to said second air containment layer.

7. A method of fabricating an apparatus for containing a flow of fluid discharged from a fracture in a duct, said method comprising:
    forming a ballistic containment layer configured to be exposed to the fluid, wherein the ballistic containment layer mates against the duct;
    forming an insulation sheath, wherein the insulation sheath is configured to restrict heat transfer from within the duct, wherein forming the insulation sheath comprises:
        forming a first air containment layer;
        forming a second air containment layer; and
        forming an insulation layer positioned between the first and second air containment layers;
    forming a vent through the first air containment layer, the second air containment layer, and the insulation layer; and
    coupling the ballistic containment layer to the insulation sheath such that the insulation sheath circumscribes said ballistic containment layer.

8. The method of claim 7, wherein forming a ballistic containment layer comprises forming a ballistic containment layer from a temperature resistant material that is permeable to enable the fluid to flow therethrough.

9. The method of claim 8, wherein forming a ballistic containment layer comprises forming a ballistic containment layer from a fiberglass weave of S-glass fibers.

10. The method of claim 7, wherein forming the first and second air containment layers comprises forming the first and second air containment layers from a temperature resistant material that is substantially impermeable to prevent the fluid from flowing therethrough.

11. The method of claim 10, wherein forming the first and second air containment layers comprises forming the first and second air containment layers from one of silicone rubber or silicone coated fiberglass.

12. The method of claim 7, wherein forming the insulation sheath comprises encapsulating the insulation layer between the first and second air containment layers to substantially isolate the insulation layer from the fluid flowing from the duct through the fracture.

13. A duct protection system for a vehicle, said system comprising:
    a duct configured to channel a fluid therethrough; and
    a duct burst apparatus comprising:
        a ballistic containment layer configured to be exposed to the fluid, wherein said ballistic containment layer mates against said duct;
        an insulation sheath coupled to said ballistic containment layer such that said insulation sheath circumscribes said ballistic containment layer, wherein said insulation sheath is configured to restrict heat transfer from within the duct, said insulation sheath comprising:
            a first air containment layer;
            a second air containment layer; and
            an insulation layer positioned between said first and second air containment layers; and
        a vent defined through said first air containment layer, said second air containment layer, and said insulation layer.

14. The duct protection system according to claim 13, wherein said ballistic containment layer is permeable to enable the fluid flow to pass therethrough.

15. The duct protection system according to claim 13, wherein said first and said second air containment layers are formed from a temperature-resistant material that is impermeable to the fluid flow from the fracture, wherein said first and said second air containment layers substantially encapsulate said insulation layer to prevent exposure of said insulation layer to the fluid flowing from said duct through the fracture.

* * * * *